United States Patent
Takahashi

(10) Patent No.: US 7,196,980 B2
(45) Date of Patent: Mar. 27, 2007

(54) INFORMATION DISK RECORDING/REPRODUCING DEVICE AND METHOD FOR CONTROLLING RECORDING/REPRODUCING SPEED THEREOF

(75) Inventor: Yorio Takahashi, Onsen-gun (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 51 days.

(21) Appl. No.: 10/505,479

(22) PCT Filed: Mar. 10, 2003

(86) PCT No.: PCT/JP03/02805

§ 371 (c)(1),
(2), (4) Date: Aug. 23, 2004

(87) PCT Pub. No.: WO03/083855

PCT Pub. Date: Oct. 9, 2003

(65) Prior Publication Data

US 2005/0152241 A1    Jul. 14, 2005

(30) Foreign Application Priority Data

Mar. 29, 2002    (JP)    ............... 2002-093418

(51) Int. Cl.
*G11B 7/00* (2006.01)

(52) U.S. Cl. ............... 369/44.28; 369/44.32; 369/53.14

(58) Field of Classification Search ............... None
See application file for complete search history.

(56) References Cited

U.S. PATENT DOCUMENTS

| | | | | |
|---|---|---|---|---|
| 6,009,053 A | * | 12/1999 | Ota et al. ............... | 369/44.32 |
| 6,118,739 A | * | 9/2000 | Kishinami et al. ........ | 369/44.28 |
| 6,304,528 B1 | * | 10/2001 | Kanda et al. ............ | 369/44.28 |
| 6,351,440 B1 | * | 2/2002 | Fukuda et al. ........... | 369/47.36 |
| 6,711,109 B1 | * | 3/2004 | Fukuda ................... | 369/53.14 |

FOREIGN PATENT DOCUMENTS

| | | |
|---|---|---|
| JP | 10-143991 | 5/1998 |
| JP | 11-39785 | 2/1999 |
| JP | 11-203778 | 7/1999 |
| JP | 11-317003 | 11/1999 |
| JP | 2000-11531 | 1/2000 |
| JP | 2000-113581 | 4/2000 |
| JP | 2001-35068 | 2/2001 |

* cited by examiner

*Primary Examiner*—William Korzuch
*Assistant Examiner*—Christopher Lamb
(74) *Attorney, Agent, or Firm*—Steptoe & Johnson LLP

(57) ABSTRACT

Information about the number of traversed tracks is acquired with a code at a first rotational speed and a second rotational speed in each area provided by dividing one rotation into m (m is a natural number equal to or larger than 1). As to the information about the number of traversed tracks, a difference is calculated between the areas. A value proportionate to the sum of absolute values of the information about the traversed tracks in the areas is used as a vibration detection value proportionate to vibration amplitude.

10 Claims, 9 Drawing Sheets

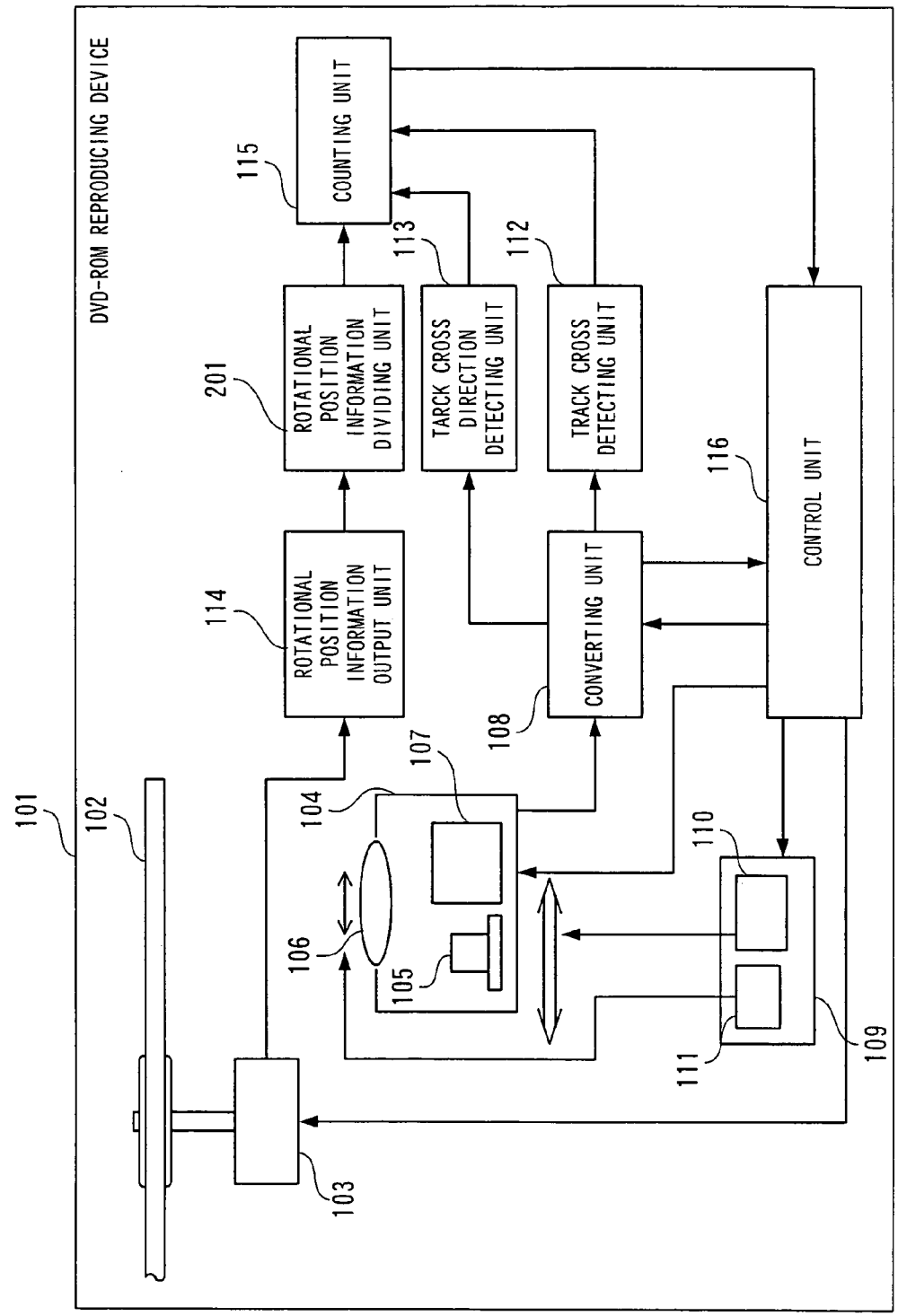

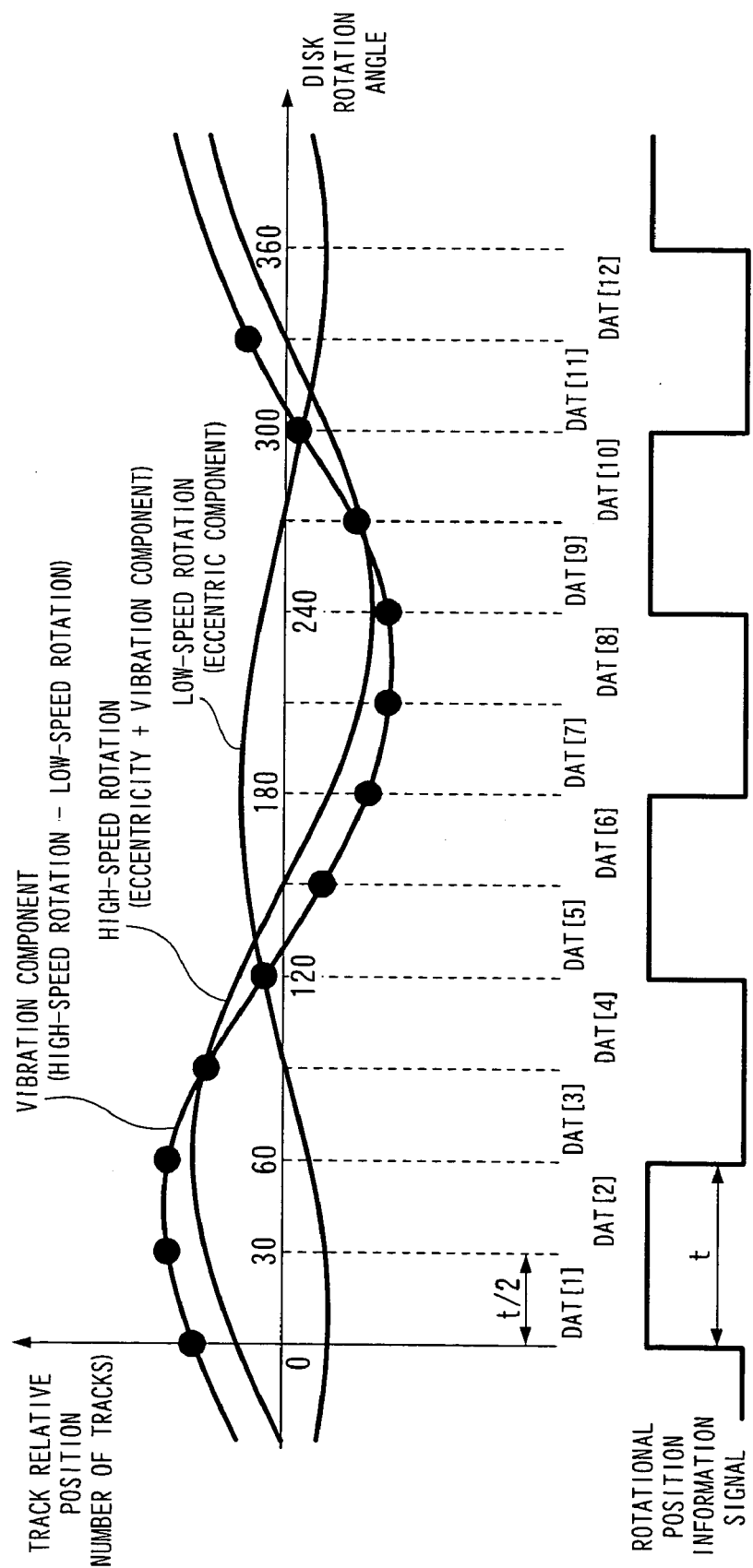

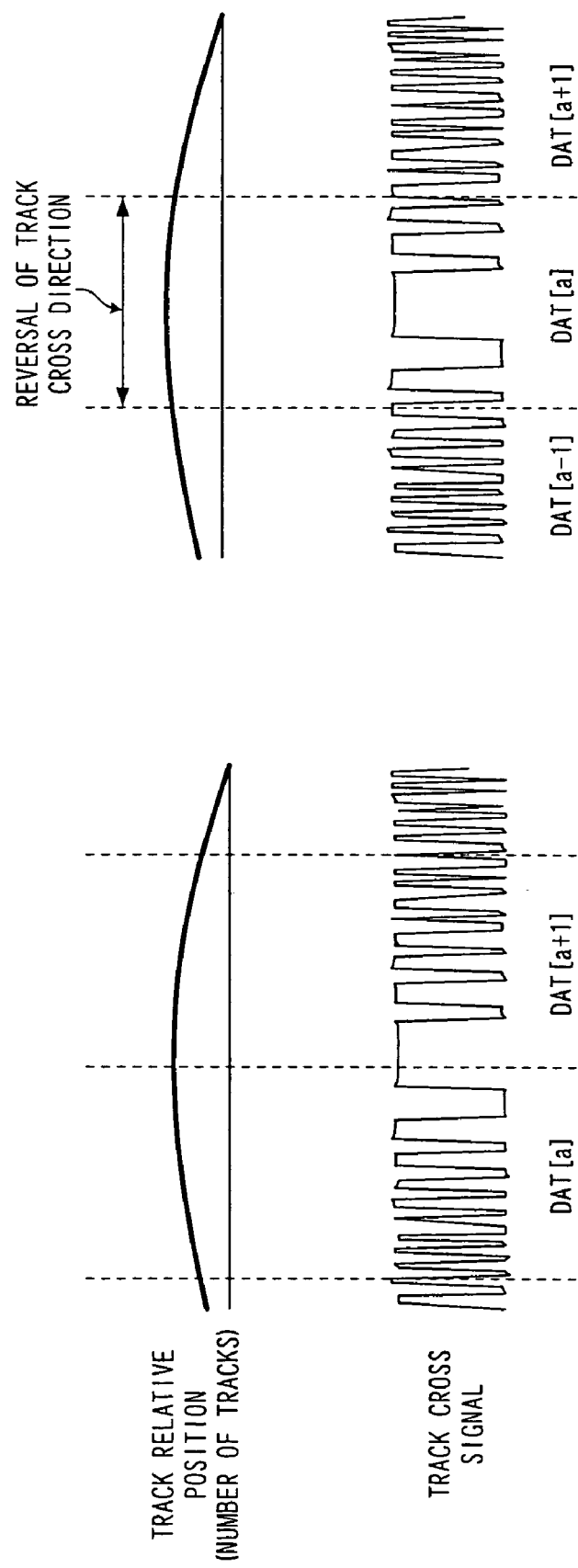

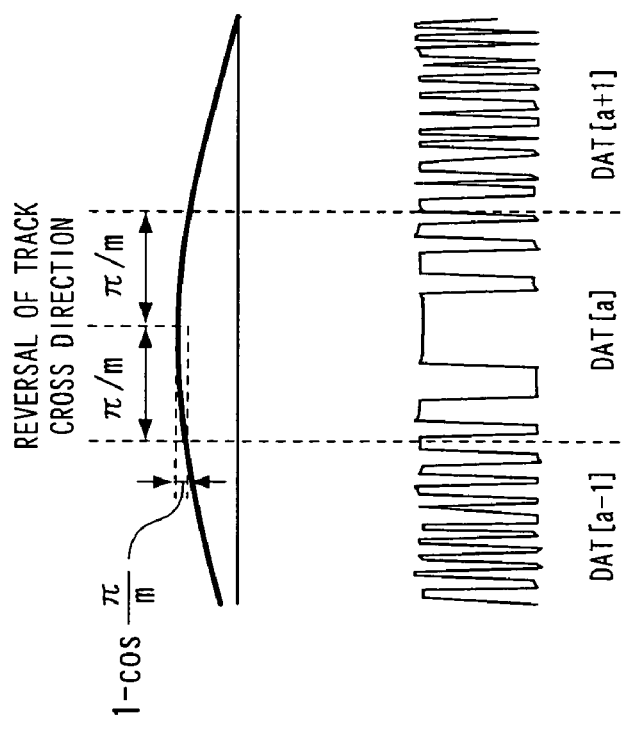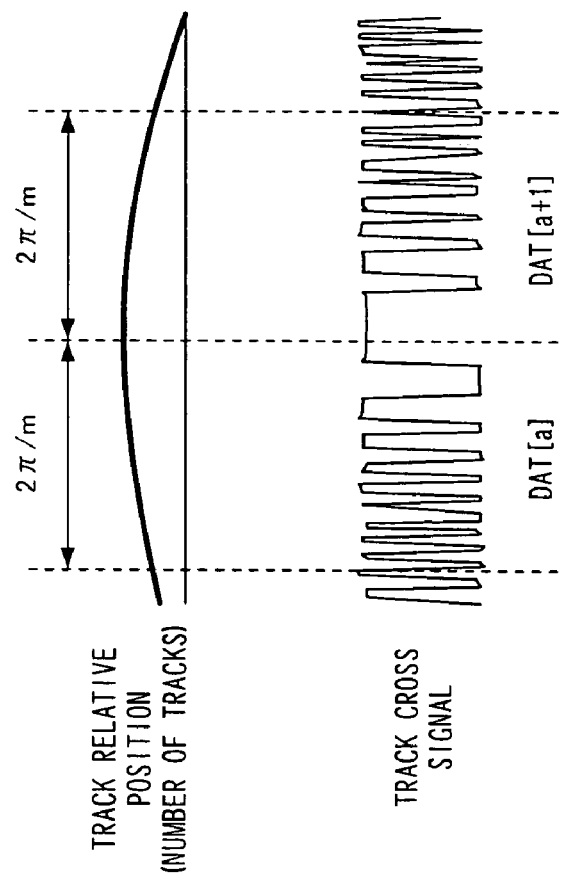

INFORMATION DISK RECORDING/REPRODUCING DEVICE AND METHOD FOR CONTROLLING RECORDING/REPRODUCING SPEED THEREOF

TECHNICAL FIELD

The present invention relates to an information disk recording/reproducing device and a method for controlling a recording/reproducing speed thereof whereby a rotational speed limit is controlled in order to prevent a vibration caused by mass eccentricity from adversely affecting a disk serving as an information recording medium.

BACKGROUND ART

Optical disk reproducing devices have remarkably improved in recording/reproducing speed in recent years. The improvement in recording/reproducing speed has been achieved by increasing the rotational speeds of optical disks.

However, when an optical disk is increased in rotational speed, a vibration caused by mass eccentricity of the optical disk adversely affects the control of a servo and so on, resulting in inconvenience on the user of an optical disk reproducing device.

In order to prevent such adverse effect of a vibration caused by a disc of large mass eccentricity, when the disk of large mass eccentricity is loaded, an optical disk reproducing device controls the rotary driving of an optical disk so as to limit the rotational speed of the optical disk.

The vibration amplitude caused by the disk is measured during the control. The measurement is a significant technique for preventing the adverse effect of a vibration caused by the disk of large eccentricity in the optical disk reproducing device. Particularly a vibration detecting technique using a track count is known as an inexpensive detecting method not demanding additional cost for the installation of a vibration sensor or the like which directly detects a mechanical vibration.

As described above, the conventional optical disk reproducing device which uses a track count to detect a vibration will be described below. An optical disk reproducing device of Japanese Patent Laid-Open No. 2000-113581 will be discussed as an example.

FIG. 9 is a block diagram showing the configuration of a conventional optical disk reproducing device for detecting a vibration using a track count. In FIG. 9, reference numeral 900 denotes an optical disk reproducing device, reference numeral 801 denotes a base, reference numeral 802 denotes a disk motor fixed on the base 801, reference numeral 803 denotes insulators for supporting the base 801, reference numeral 804 denotes a disk to be reproduced that is mounted on the disk motor 802, reference numeral 901 denotes an optical head, reference numeral 902 denotes an elastic member for suspending the optical head 901 from the base 801, reference numeral 903 denotes a light beam which is incident on the optical disk 804 from the optical head 901, reference numeral 904 denotes information recording tracks which are formed like concentric circles or spirals with constant pitches on an information recording surface 804A of the disk 804, reference numeral 905 denotes a track cross detecting section which generates a track cross pulse and a cross signal from a signal reproduced when the light beam 903 traverses the information recording tracks 904, reference numeral 906 denotes a counting section for counting the track cross pulses, reference numeral 907 denotes a measuring section for deciding a quantity of mass eccentricity based on the counting result of the counting section 906, and reference numeral 908 denotes a motor control section which controls the number of rotations of the disk motor 802 and outputs rotation angle information to the measuring section 907.

Regarding the conventional optical disk reproducing device configured thus, a vibration detecting operation will be described below.

First, in the optical disk reproducing device 900, the optical head 901 is kept at a fixed distance from the disk 804 so that the focus of the optical beam 903 is positioned on the information recording surface 804A of the disk 804. The relative position of the optical head 901 to the disk 804 in the radius direction (the direction of arrow R) of the disk 804 has a vibration characteristic indicated by a natural frequency foA, which is determined by the mass of optical head 901 and the spring constant of the elastic member 902 made of a material such as a metal, a resin, and a rubber.

The base 801 is supported by the insulators 803 made of a material such as a metal, a resin, and a rubber. When centrifugal force generated by the rotation of the disk 804 is propagated to the base 801 through the disk motor 802, the base 801 is vibrated according to a characteristic indicated by a natural frequency foM, which is determined by the spring constant of the insulators 803 and the mass of all the constituent elements including the base 801, the optical head 901, the disk motor 802, and the disk 804 that are mounted on the base 801.

The motor control section 908 rotates the disk motor 802 at a first rpm (low-speed rotation) sufficiently lower than the natural frequency foA. The optical disk 804 mounted on the disk motor 802 rotates at the first rpm.

At the first rpm sufficiently lower than the natural frequency foA, the optical head 901 is vibrated integrally with the base 801. The relative positions of the optical head 901 and the optical disk 804 hardly change. Hence, at the first rpm sufficiently lower than the natural frequency foA, the light beam 903 traverses the information tracks 904. The number of the information recording tracks 904 corresponds to an eccentricity amount thereof. The light beam 903 generates a track cross corresponding to the number of the information recording tracks 904.

Based on the reproduction signal of the optical head 901, the track cross detecting section 905 detects the track cross corresponding to the number of the information recording tracks 905 traversed by the light beam 903. The track cross detecting section 905 generates a track cross pulse corresponding to the detected track cross. The track cross detection section 905 outputs the generated track cross pulse to the counting section 906.

The counting section 906 counts track cross pulses of one rotation of the disk 804 based on rotation angle information from the motor control section 908. The measuring section 907 stores, as N1(0) to N1 (n−1), the counting result of track cross pulses of one rotation of the disk 804 which is counted by the counting section 906 for each area obtained by dividing one rotation into n.

Subsequently, the motor control section 908 rotates the disk motor 802 at a second rpm (high-speed rotation) which is higher than the natural frequency foA and is lower than the natural frequency foM. The mass eccentricity of the disk 804 generates centrifugal force on the disk 804. The base 801 is vibrated according to amplitude determined by the spring constant of the insulators 803, the mass eccentricity amount of the disk 804, the mass of all the constituent elements mounted on the base 801.

When the disk motor 802 is rotated at the second rpm which is higher than the natural frequency foA and lower than the natural frequency foM, only the base 801, the disk motor 802, and the disk 804 are integrally vibrated and the optical head 901 is made stationary. Hence, a relative displacement between the disk 804 and the optical head 901 is equal to the vibration displacement of the base 801. As a result, the light beam 903 generates a track cross having the number of tracks corresponding to the sum of the eccentricity amount of the information recording track 904 and the vibration amplitude of the base 801.

Based on the reproduction signal of the optical head 901, the track cross detecting section 905 detects a track cross corresponding to the number of tracks which are equivalent to the sum of the eccentricity amount of the information recording track 904 and the vibration amplitude of the base 801. The track cross detecting section 905 generates a track cross pulse corresponding to the number of tracks which are equivalent to the sum of the eccentricity amount of the information recording track 904 and the vibration amplitude of the base 801. The track cross detecting section 905 outputs generated track cross pulse to the counting section 906.

The counting section 906 counts a track cross pulse of one rotation of the disk 804 based on rotation angle information from the motor control section 908. The measuring section 907 performs an operation to obtain the vibration amplitude of the base 801 after subtracting count results $N1(1)$ to $N1(n)$ from count results $N2(1)$ to $N2(n)$ counted by the measuring section 906.

To be specific, the vibration amplitude is obtained by the equation below.

$$dat[1] = N1(1) - N2(1) \quad \text{(Equation 15)}$$
$$dat[2] = N1(2) - N2(2)$$
$$\vdots$$
$$dat[n] = N1(n) - N2(n)$$

For example, when n=6, the following equations are established:

$$\text{VIBRATIN AMPLITUDE } 1[n] = \frac{2}{\sqrt{3}} \quad \text{(Equation 16)}$$
$$\sqrt{|DAT[n]^2 + DAT[n]DAT[n+1] + DAT[n+1]^2|}$$

$$\text{VIBRATION AMPLITUDE } 2[n] = \frac{2}{\sqrt{3}} \quad \text{(Equation 17)}$$
$$\sqrt{|DAT[n]^2 + DAT[n]DAT[n+2] + DAT[n+2]^2|}$$

(when n=1 to 6 and n>6, n=n−6 is established)

In an operation of a square root, since the number of program steps is ordinarily increased, a value proportionate to the square of vibration amplitude is used as a vibration detection value. Further, of track count data in an area divided into n, a vibration detection value is found only from data in two areas. Thus, an error count of one area seriously affects a detection value. In order to avoid the influence, the following method is known: 12 vibration detection values in total are calculated by (equation 16) and (equation 17), from which six values are calculated, respectively, and an average value of these plural median values or the twelve pieces of data is used as a vibration detection value.

Then, the maximum rotational speed of a disk of an optical disk device is determined by comparing the calculated vibration detection value with a threshold value.

However, in the conventional optical disk reproducing device disclosed in Japanese Patent Laid-Open No. 2000-113581, the track count result of an eccentric component measured at the first rotational speed is subtracted by arithmetic after the track count result is measured at the second rotational speed. Thereafter, it is necessary to further perform a complicated operation to obtain a vibration detection value corresponding to vibration amplitude. Thus, a value proportionate to the square of vibration amplitude is usually used as a vibration detection value. In this case, since the square of vibration amplitude is used, it is necessary to use a high-precision variable (with a large significant figure) for calculation in order to precisely control a recording/reproducing speed.

Moreover, a number of multiplications are used and the calculation is complicated, thereby increasing the number of program steps for control. For this reason, it takes a long time to calculate a vibration detection value, delaying the result. Thus, it is not possible to promptly control a recording/reproducing speed.

Therefore, it is an object of the present invention to provide an information disk recording/reproducing device and a method for controlling a recording/reproducing speed thereof whereby a recording/reproducing speed can be precisely controlled without the necessity for using a high-precision variable for computing a vibration detection value, and a vibration detection value can be promptly calculated and a recording/reproducing speed can be controlled without the necessity for an extra number of program steps.

DISCLOSURE OF INVENTION

An information disk recording/reproducing device according to claim 1 of the present invention, in which recording or reproduction can be performed on an information disk having an information recording track formed like a spiral or a concentric circle, comprises: a disk rotating unit for rotating the information disk; a rotational position information output unit for outputting rotational position information for the information disk of the disk rotating unit in each area provided by dividing one rotation into m (m is a natural number equal to or larger than 2); a reading unit for reading an information signal from the information disk; a radius direction driving unit for driving the reading unit in the radius direction of the information disk; a track cross detecting unit for detecting a track cross caused by crossing and generating a track cross signal based on a reproduction signal when the reading unit is traversed on the information recording track by the driving of the radius direction driving unit; a track cross direction detecting unit for detecting the direction of the track cross caused by the crossing based on the reproduction signal when the reading unit is traversed on the information recording track by the driving of the radius direction driving unit; a counting unit for counting the pulses of a track cross signal from the track cross detecting unit, with a code indicating a track cross direction from the track cross direction detecting unit, based on the output from the rotational position information output unit in each of the areas divided into m; and a control unit which rotates the disk rotating unit at a first speed, obtains a first counted value of the counting unit while making the radius direction driving unit non-operational, rotates the disk rotating unit at one or more kinds of rotational speeds of second, third, . . . rotational speeds higher than the first rotational speed, obtains second, third, . . . counted values of the counting unit while making the radius direction driving unit non-operational, and compares a difference between the first counted value and the second, third, . . . counted values with a threshold value so as to determine the maximum rotational speed of the information disk, the threshold value being predetermined while using, as a vibration detection value, a value proportionate to the sum of absolute values of counted values obtained in the areas divided into m.

With the configuration of the information disk recording/reproducing device, it is possible to calculate a vibration detection value proportionate to vibration amplitude without the necessity for complicated calculations. Hence, it is possible to promptly calculate a vibration detection value and control a recording/reproducing speed without an extra number of program steps.

An information disk recording/reproducing device according to claim 2 of the present invention, in which recording 35 or reproduction can be performed on an information disk having an information recording track formed like a spiral or a concentric circle, comprises: a disk rotating unit for rotating the information disk; a rotational position information output unit for outputting rotational position information for the information disk of the disk rotating unit in each area provided by dividing one rotation into n (n is a natural number equal to or larger than 2); a rotational position information dividing unit which further divides into k (k is a natural number equal to or larger than 1) the area having been provided by dividing one rotation into n for the rotational position information from the rotational position information output unit and outputs the rotational position information in each of m=n·k areas; a reading unit for reading an information signal from the information disk; a radius direction driving unit for driving the reading unit in the radius direction of the information disk; a track cross detecting unit for detecting a track cross caused by crossing and generating a track cross signal based on a reproduction signal when the reading unit is traversed on the information recording track by the driving of the radius direction driving unit; a track cross direction detecting unit for detecting the direction of the track cross caused by the crossing on the reproduction signal when the reading unit is traversed on the information recording track by the driving of the radius direction driving unit; a counting unit for counting the pulses of a track cross signal from the track cross detecting unit, with a code indicating a track cross direction from, the track cross direction detecting unit, based on the output from the rotational position information dividing unit in each of the areas divided into m; and a control unit which rotates the disk rotating unit at a first speed, obtains a first counted value of the counting unit while making the radius direction driving unit non-operational, rotates the disk rotating unit at one or more kinds of rotating speeds of second, third, . . . rotational speeds higher than the first rotational speed, obtains second, third, counted values of the counting unit while making the radius direction driving unit non-operational, and compares a difference between the first counted value and the second, third, . . . counted values with a predetermined threshold value so as to determine the maximum rotational speed of the information disk while fusing, as a vibration detection value, a value proportionate to the sure of absolute values of counted values obtained in the areas divided into m.

With this configuration of the information disk recording/reproducing device, the number of traversed tracks is counted for each of the k areas obtained by further evenly dividing the rotational position information of the rotational position information detecting unit. Thus, it is possible to acquire more detailed rotational position information for one rotation, increase accuracy, and calculate a vibration detection value proportionate to vibration amplitude without the necessity for complicated calculations. Hence, it is possible to promptly calculate a vibration detection value and control a recording/reproducing speed without an extra number of program steps.

Moreover, an information disk recording/reproducing device according to claim 3 of the present invention is the information disk recording/reproducing device according to claim 1 or 2. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 19)}$$

and a value proportionate to the vibration quantity is used as a vibration detection value.

With this configuration of the information disk recording/reproducing device, it is possible to calculate a vibration detection value proportionate to vibration amplitude without the necessity for complicated calculations. Hence, it is possible to promptly calculate a vibration detection value and control a recording/reproducing speed without an extra number of program steps.

Further, an information disk recording/reproducing device according to claim 4 of the present invention is the information disk recording/reproducing device according claim 1 or 2. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 21)}$$

a value proportionate to the vibration quantity is used as a vibration detection value, and the m divisions for one rotation is determined within a permissible error range based on the maximum value of an error relative to an actual vibration quantity at this point, the maximum value being expressed by the equation below:

$$\text{ERROR} \leq 1 - \cos\frac{\pi}{m} \qquad \text{(Equation 22)}$$

With this configuration of the information disk recording/reproducing device, since an optimum number of divisions for one rotation is determined so that the error range of a vibration detection value is within a required range, it is possible to calculate, with required accuracy, a vibration detection value proportionate to vibration amplitude without the necessity for complicated calculations. Hence, it is possible to promptly calculate a vibration detection value and control a recording/reproducing speed without an extra number of program steps.

Further, an information disk recording/reproducing device according to claim 5 of the present invention is the information disk recording/reproducing device according to claim 1 or 2. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 24)}$$

a value proportionate to the vibration quantity is used as a vibration detection value, and the m divisions for one rotation is set at 24 so that an error relative to an actual vibration quantity at this point has a maximum value of 1% or less.

With this configuration of the information disk recording/reproducing device, it is possible to keep an error of a calculated vibration quantity value with required accuracy while minimizing the number of divisions of the rotational position information output unit. Hence, it is possible to promptly calculate a vibration detection value and control a recording/reproducing speed without the necessity for an extra number of program steps.

Further, a method for controlling a recording/reproducing speed of an information disk recording/reproducing device according to claim 6 of the present invention, in which recording or reproduction can be performed on an information disk having an information recording track formed like a spiral or a concentric circle, the device comprising a disk rotating unit for rotating the information disk, a reading unit for reading an information signal from the information disk, and a radius direction driving unit for driving the reading unit in the radius direction of the information disk. This method comprises the steps of rotating the information disk; outputting rotational position information for the information disk in each area provided by dividing one rotation into m (m is a natural number equal to or larger than 2); reading an information signal from the information disk; driving the reading unit in the radius direction of the information disk; detecting a track cross caused by crossing and generating a track cross signal based on a reproduction signal when the reading unit is traversed on the information recording track by the driving of the radius direction driving unit; detecting the direction of the trace cross caused by the crossing based on the reproduction signal when the reading unit is traversed on the information recording track. by the driving of the radius direction driving unit; counting the pulses of a track cross signal, with a code indicating the track cross direction, to obtain a first counted value in each of the areas provided by dividing one rotation of the rotational position information into m while rotating the disk rotating unit at a first speed and making the radius direction driving unit non-operational; counting the pulses of the track cross signal, with the code . . . counted values in each of the areas provided by dividing one rotation of the rotational position information into m while rotating the disk rotating unit at one or more kinds of second, third, rotational speeds higher than the first rotational speed and making the radius direction driving unit non-operational; and comparing a difference between the first counted value and the second, third, counted values with a predetermined threshold value so as to determine the maximum rotational speed of the information disk while using, as a vibration detection value, a value proportionate to the sum of absolute values of counted values obtained in the areas divided into m.

According to the method for controlling a recording/reproducing speed of the information disk recording/reproducing device, it is possible to calculate a vibration detection value proportionate to vibration amplitude without the necessity for complicated calculations. Hence, it is possible to promptly calculate a vibration detection value and control a recording/reproducing speed without the necessity for an extra number of program steps.

A method for controlling a recording/reproducing speed of an information disk recording/reproducing device according to claim 7 of the present invention, in which recording or reproduction can be performed on an information disk having an information recording track formed like a spiral or a concentric circle, the device comprising a disk rotating unit for rotating the information disk, a reading unit for reading an information signal from the information disk, and a radius direction driving unit for driving the reading unit in the radius direction of the information disk. This method comprises the steps of: rotating the information disk; outputting rotational position information for the information disk in each of m=n·k areas provided by further dividing into k (k is a natural number equal to or larger than 1) an area having been provided by dividing one rotation into m (m is a natural number equal to or larger than 2); reading an information signal from the information disk; driving the reading unit in the radius direction of the information disk; detecting a track cross caused by crossing and generating a track cross signal based on a reproduction signal when the reading unit is traversed on the information recording track by the driving of the radius direction driving unit; detecting the direction of the track cross caused by the crossing based on the reproduction signal when the reading unit is traversed on the information recording track by the driving of the radius direction driving unit; counting the pulses of a track cross signal, with a code indicating the track cross direction, to obtain a first counted value in each of the areas provided by dividing one rotation of the rotational position information into m while rotating the disk rotating unit at a first speed and making the radius direction driving unit non-operational; counting the pulses of the track cross signal, with the code indicating the track cross direction, to obtain second, third, . . . counted values in each of the areas provided by dividing one rotation of the rotational position information into m while rotating the disk rotating unit at one or more kinds of second, third, . . . rotational speeds higher than the first rotational speed and making the radius direction driving unit non-operational; and comparing a difference between the first counted value and the second, third, . . . counted values with a predetermined threshold value so as to determine the maximum rotational speed of the information disk while using, as a vibration detection value, a value proportionate to the sum of absolute values of counted values obtained in the areas divided into m.

According to the method for controlling a recording/reproducing speed of the information disk recording/reproducing device, the number of traversed tracks is counted for each of the k areas obtained by further evenly dividing the rotational position information of the rotational position information detecting unit. Thus, it is possible to acquire more detailed rotational position information for one rotation, increase accuracy, and calculate a vibration detection value proportionate to vibration amplitude without the necessity for complicated calculations. Hence, it is possible to promptly calculate a vibration detection value and control a recording/reproducing speed without an extra number of program steps.

A method for controlling a recording/reproducing speed of an information disk recording/reproducing device according to claim 8 of the present invention is the method for controlling a recording/reproducing speed of the information disk recording/reproducing device according claim 6 or 7. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 26)}$$

and a value proportionate to the vibration quantity is used as a vibration detection value.

According to the method for controlling a recording/reproducing speed of the information disk recording/reproducing device, it is possible to calculate a vibration detection value proportionate to vibration amplitude without the necessity for complicated calculations. Hence, it is possible to promptly calculate a vibration detection value and control a recording/reproducing speed without an extra number of program steps.

Further, a method for controlling a recording/reproducing speed of an information disk recording/reproducing device according to claim 9 of the present invention is the method for controlling a recording/reproducing speed of the information disk recording/reproducing device according claim 6 or 7. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 28)}$$

a value proportionate to the vibration quantity is used as a vibration detection value, and the m divisions for one rotation is determined within a permissible error range based on the maximum value of an error relative to an actual vibration quantity at this point, the maximum value being expressed by the equation below:

$$\text{ERROR} \le 1 - \cos\frac{\pi}{m} \qquad \text{(Equation 29)}$$

According to the method of controlling a recording/reproducing speed of the information disk recording/reproducing device, since an optimum number of divisions for one rotation is determined so that the error range of a vibration detection value is within a required range, it is possible to calculate, with required accuracy, a vibration detection value proportionate to vibration amplitude without the necessity for complicated calculations. Hence, it is possible to promptly calculate a vibration detection value and control a recording/reproducing speed without an extra number of program steps.

Moreover, a method for controlling a recording/reproducing speed of an information disk recording/reproducing device according to claim 10 of the present invention is the method for controlling a recording/reproducing speed of the information disk recording/reproducing device according claim 6 or 7. In each of the areas divided into m divisions, a difference between the counted value at the first rotational speed and the counted value at each of the second, third through m rotational speeds is expressed by the terms DAT[1] through DAT[m].

A vibration quantity at this point is approximated by the equation below:

$$\text{VIBRATION QUANTITY} = \frac{1}{4}\sum_{x=1}^{m} |DAT[x]| \qquad \text{(Equation 31)}$$

a value proportionate to the vibration quantity is used as a vibration detection value, and the m divisions for one rotation is set at 24 so that an error relative to an actual vibration quantity at this point has a maximum value of 1% or less.

According to the method for controlling a recording/reproducing speed of the information disk recording/reproducing device, it is possible to keep an error of a calculated vibration quantity value with required accuracy while minimizing the number of divisions of the rotational position information output unit. Hence, it is possible to promptly calculate a vibration detection value and control a recording/reproducing speed without the necessity for an extra number of program steps.

As described above, it is possible to calculate a vibration detection value proportionate to vibration amplitude without the necessity for complicated calculations. Hence, it is possible to promptly calculate a vibration detection value and control a recording/reproducing speed without the necessity for an extra number of program steps.

In addition, the number of traversed tracks is counted for each of the k areas obtained by further evenly dividing the rotational position information of the rotational position information detecting unit. Thus, it is possible to acquire more detailed rotational position information for one rotation, increase accuracy, and calculate a vibration detection value proportionate to vibration amplitude without the necessity for complicated calculations. Hence, it is possible to promptly calculate a vibration detection value and control a recording/reproducing speed without the necessity for an extra number of program steps.

Further, since an optimum number of divisions for one rotation is determined so that the error range of a vibration detection value is within a required range, it is possible to calculate, with required accuracy, a vibration detection value proportionate to vibration amplitude without the necessity for complicated calculations. Hence, it is possible to promptly calculate a vibration detection value and control a recording/reproducing speed without the necessity for an extra number of program steps.

Furthermore, it is possible to keep an error of a calculated vibration quantity value with required accuracy while minimizing the number of divisions of the rotational position information output unit. Hence, it is possible to promptly calculate a vibration detection value and control a recording/reproducing speed without the necessity for an extra number of program steps.

Therefore, a recording/reproducing speed can be precisely controlled without the necessity for using a high-precision variable for computing a vibration detection value, and a vibration detection value can be promptly calculated and a recording/reproducing speed can be controlled without the necessity for an extra number of program steps.

BRIEF DESCRIPTION OF DRAWINGS

FIG. 5 is a block diagram showing the configuration of an information disk recording/reproducing device according to Embodiment 2 of the present invention;

FIG. 6 is an explanatory drawing showing a vibration component caused by eccentricity of the disk in the information disk recording/reproducing device according to Embodiment 2;

FIG. 7 is an explanatory drawing showing a difference of counted values between the presence and absence of the detection of a track cross direction in the information disk recording/reproducing device according to Embodiment 2;

FIG. 8 is an explanatory drawing showing a method of calculating a vibration quantity error with the detection of a track cross direction of the disk in the information disk recording/reproducing device according to Embodiment 2.

BEST MODE FOR CARRYING OUT THE INVENTION

With reference to the accompanying drawings, the following will specifically describe an information disk recording/reproducing device and a method for controlling a recording/reproducing speed thereof that represent embodiments of the present invention.

Embodiment 1

Referring to FIGS. 1 to 4, the following will describe an information disk recording/reproducing device and a method for controlling a recording/reproducing speed thereof according to Embodiment 1. A DVD-ROM reproducing device will be discussed as an example.

Figure 1:
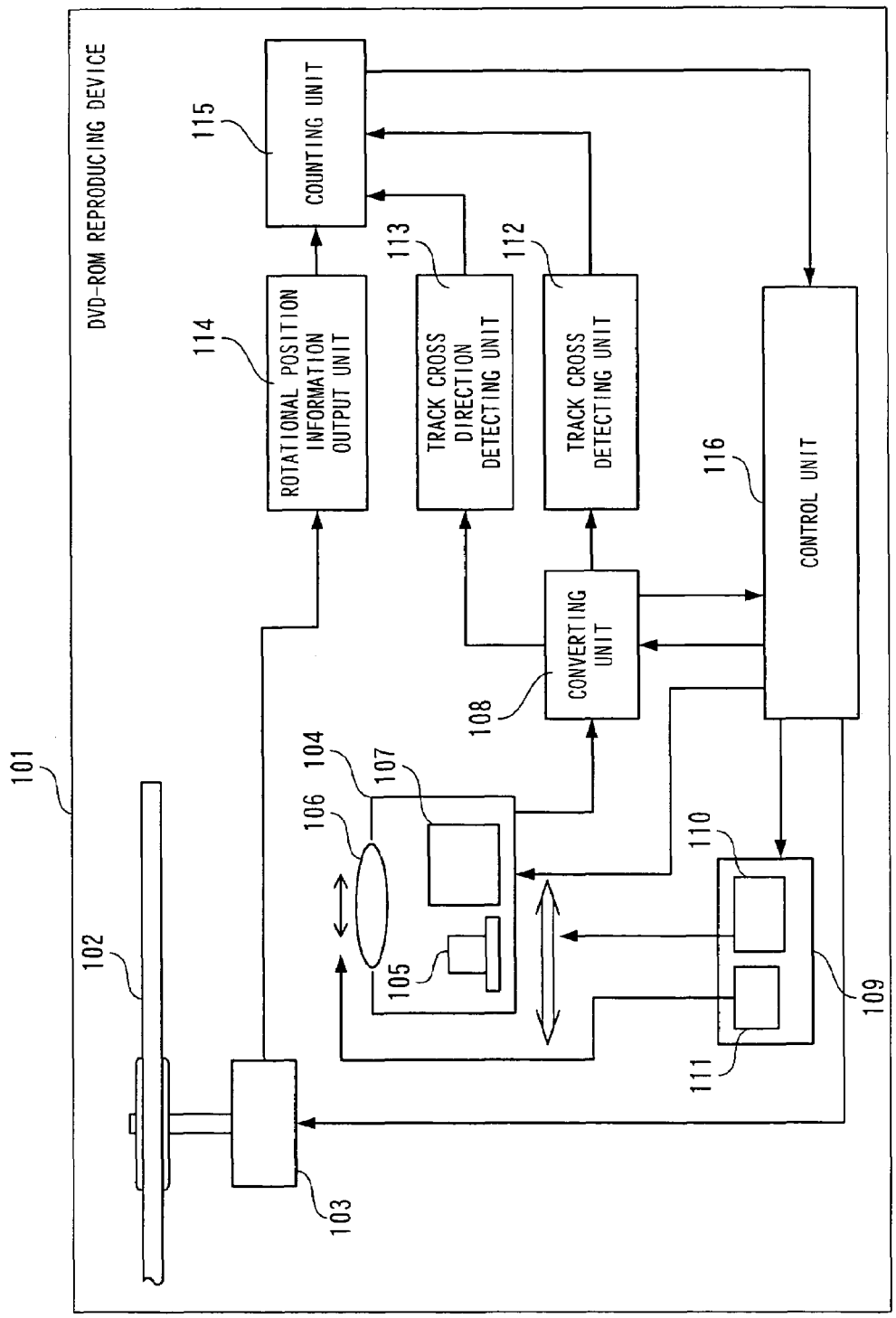
FIG. 1 is a block diagram showing the configuration of an information disk recording/reproducing device according to Embodiment 1 of the present invention.
Figure 2:
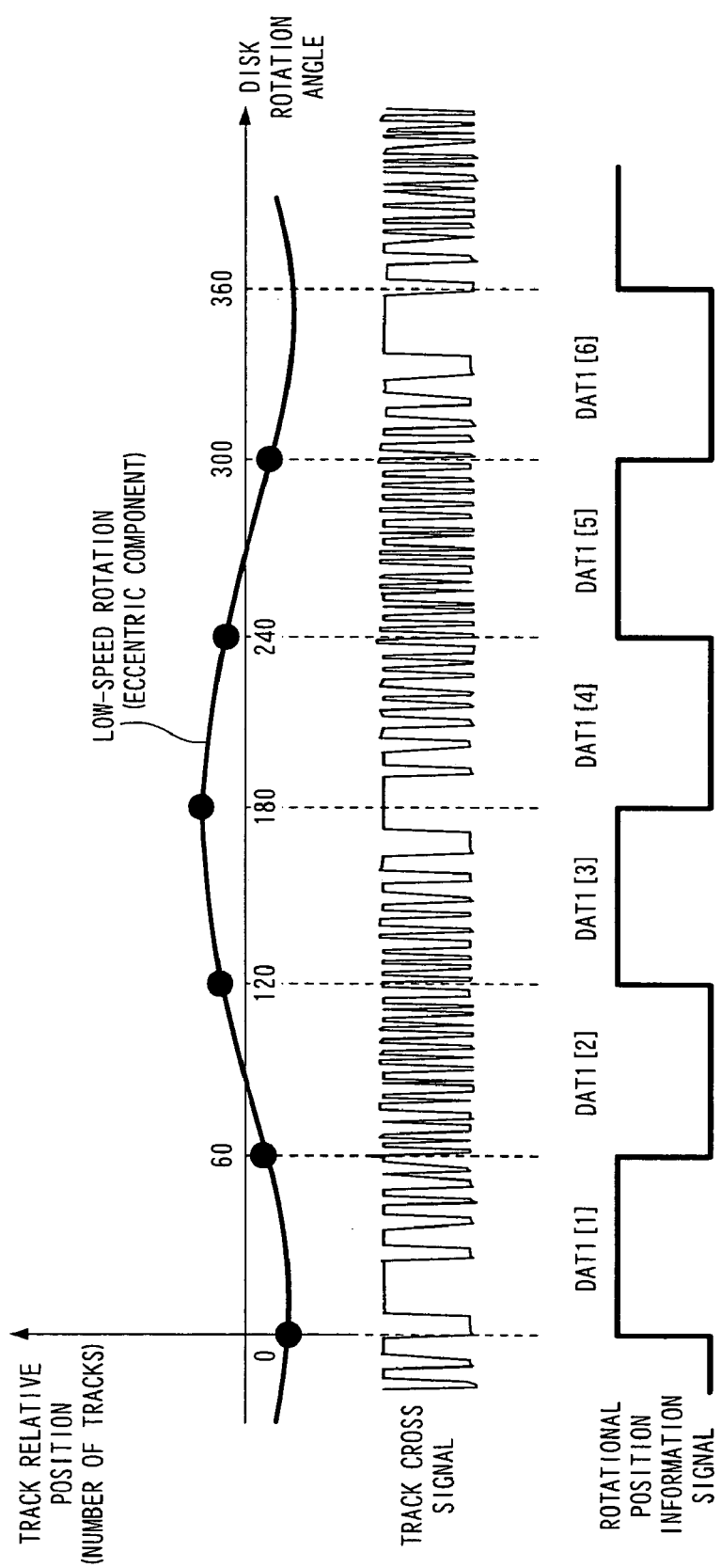
FIG. 2 is an explanatory drawing showing an operating state when a disk is rotated at low speed in the information disk recording/reproducing device according to Embodiment 1.
Figure 3:
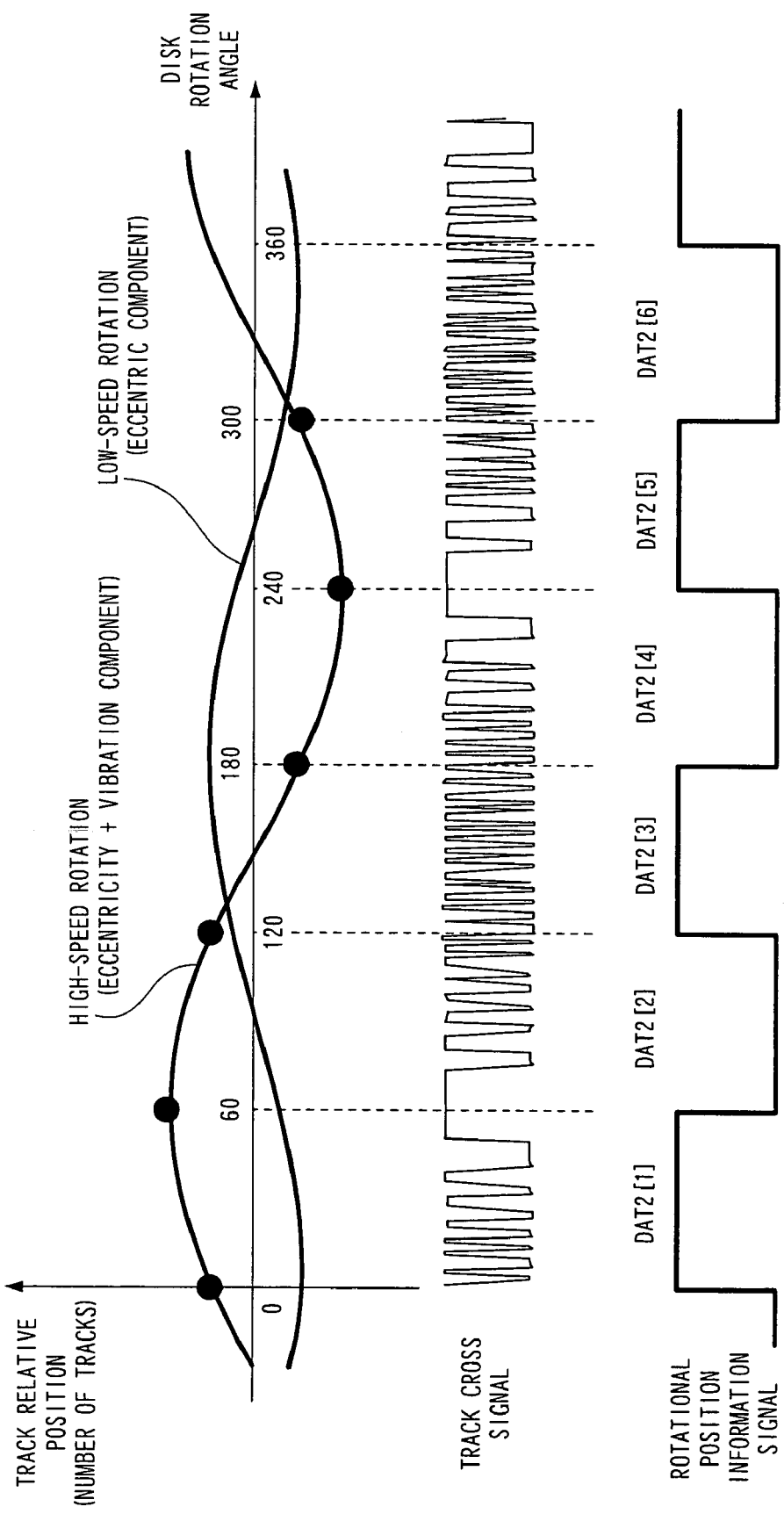
FIG. 3 is an explanatory drawing showing an operating state when the disk is rotated at high speed in the information disk recording/reproducing device according to Embodiment 1.
Figure 4:
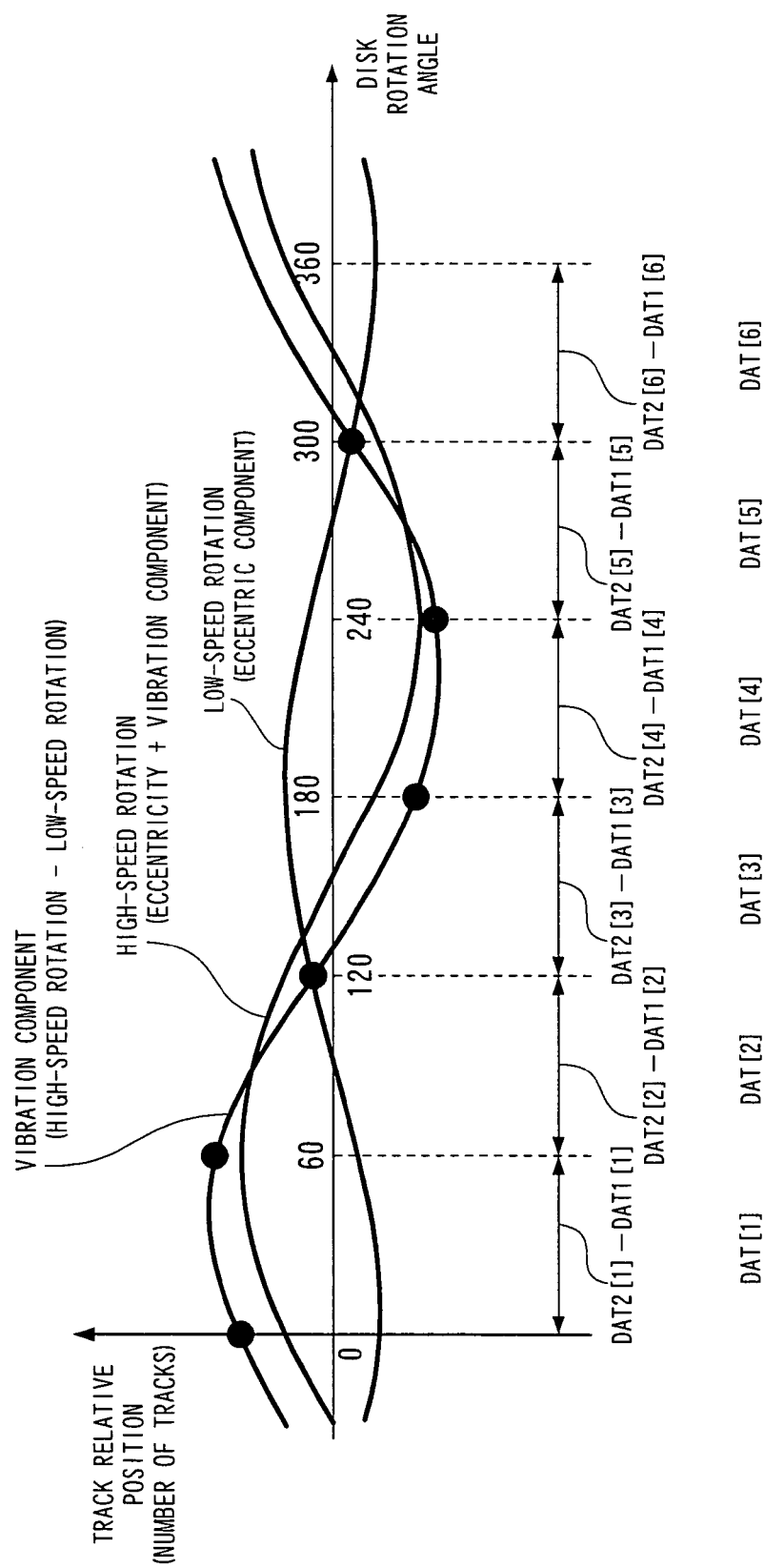
FIG. 4 is an explanatory drawing showing a vibration component caused by eccentricity of the disk in the information disk recording/reproducing device according to Embodiment 1.
Figure 9:
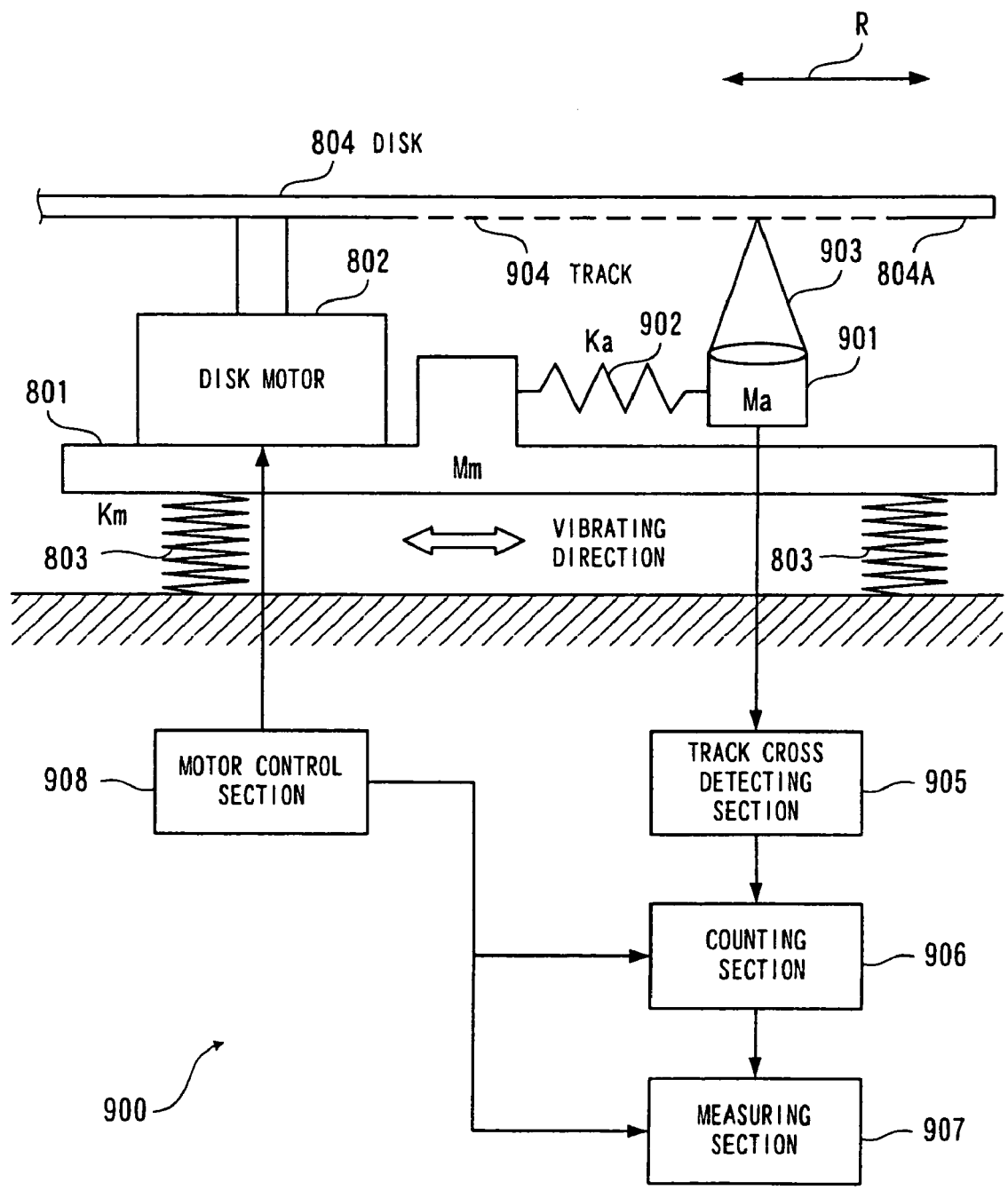
FIG. 9 is a block diagram showing the configuration of a conventional information disk recording/reproducing device.

FIG. 1 is a block diagram showing the configuration of the DVD-ROM reproducing device serving as an example of the information disk recording/reproducing device according to Embodiment 1. FIG. 2 is an explanatory drawing showing a relationship between a disk rotation angle and a rotational position information signal, a track cross signal, and a track relative position when a track cross caused by eccentricity is measured at a first rotational speed (low-speed rotation) according to Embodiment 1. FIG. 3 is an explanatory drawing showing a relationship between a disk rotation angle and a rotational position information signal, a track cross signal, and a track relative position when a track cross caused by eccentricity+vibration is measured at second, third, . . . rotational speeds (high-speed rotation) higher than the first rotational speed according to Embodiment 1. FIG. 4 is an explanatory drawing showing a method for calculating a track cross caused by a vibration based on the measurement results of a track cross caused by eccentricity at the first speed and the measurement results of a track cross caused by eccentricity+vibration at the second, third, . . . rotational speeds higher than the first rotational speed.

In FIG. 1, a DVD-ROM reproducing device 101 can reproduce a variety of optical disks 102. The DVD-ROM reproducing device 101 described in the present embodiment can reproduce, for example, disks of CD-ROM (CD-ROM, CD-R, and CD-RW), DVD-ROM (DVD-5, DVD-9, DVD-R4.7G), and DVD-R3.9G.

Reference numeral 103 denotes a disk rotating unit which rotates the optical disk 102 loaded in the DVD-ROM reproducing device 101 at a predetermined speed. Reference numeral 104 denotes a reading unit which reads an information signal from the optical disk 102. The reading unit 104 is constituted of, for example, a laser light-emitting element 105 having two different oscillation wavelengths for a CD-ROM and a DVD-ROM, an objective lens 106 for gathering laser light, and a light detecting element 107 having two systems for a CD-ROM and a DVD-ROM in the DVD-ROM device. The output of the light detecting element 107 is amplified, an output signal from the light detecting element 107 is selected according to the kind of the optical disk 102, and a tracking error signal (TE), a focus error signal (FE), a reproduction signal (RF), an All Sum signal (AS), an RF envelope signal (RFENV) and so on are generated based on the output signal, and the signals are outputted. Reference numeral 108 denotes a converting unit which converts a reproduction signal outputted from the reading unit 104 to digital data.

Reference numeral 109 denotes a radius direction driving unit which drives the reading unit 104 in the radius direction of the optical disk 102. The radius direction driving unit 109 is constituted of, for example, a traverse driving unit 110 which moves the whole reading unit 104 in the radius direction of the optical disk and a tracking actuator 111 which drives the object lens 106 in the reading unit 104 in the radius direction and finely drives the object lens 106 in the radius direction of the optical disk 102.

Reference numeral 112 denotes a track cross detecting unit which generates a track cross pulse based on a reproduction signal when the laser light of the reading unit 104 traverses tracks on the optical disk.

Reference numeral 113 denotes a track cross direction detecting unit which detects a direction when the laser light of the reading unit 104 traverses the tracks on the optical disk. For example, the track cross detecting unit 112 and the track cross direction detecting unit 113 binarize a tracking error signal, which is outputted from the reading unit 104, by using a hysteresis comparator, a comparator, or the like and generate a track count signal TKC. Further, a non-on-track signal OFTR is similarly generated from the envelope of an RF signal and a track cross direction signal is generated based on a phase relationship between TKC and OFTR signals. A method of directly using the TKC and a method of latching the TKC by OFTR to generate a detected pulse, and other methods are available for a track cross detected pulse.

Reference numeral 114 denotes a rotational position information output unit which detects a rotation angle of the disk rotating unit 103. The rotational position information output unit 114 generally uses a signal called an FG pulse which is generated from, for example, the output of a Hall device of a disk motor. As to the FG signal, three pulses are outputted for one rotation in a three-phase motor. Thus, a rotation angle can be detected in 60 degrees by counting both of a rising edge and a falling edge. Moreover, other than the FG pulse, the following method is available: a rotational speed detecting unit using an encoder is added to the disk motor and a rotational speed is detected with an arbitrary resolution.

Reference numeral 115 denotes a counting unit which has a mode for counting the number of track crossing times with a code indicating a direction based on the outputs of the track cross detecting unit 112 and the track cross direction detecting unit 113 according to the output of the rotational position information output unit 114, and a mode for performing counting without a code indicating a track cross direction. When a rotation angle can be detected every 60 degrees as described above, one rotation is divided into six areas and the number of track counts is counted with or without the code for each of the areas.

Reference numeral 116 denotes a control unit which receives signals from the converting unit 108 and the counting unit 115, processes the signals, and controls the disk rotating unit 103, the reading unit 104, the converting unit 108, and the radius direction driving unit 109.

Subsequently, the following will describe the operation of the control unit 116 which detects a vibration and sets the maximum rotational speed.

The present embodiment will describe an example in which the DVD-ROM reproducing device 101 has corresponding reproducing speeds of:
CD: 8×CAV (about 1660 rpm)
  16×CAV (about 3330 rpm)
  24×CAV (about 4990 rpm)
DVD: 2.5×CAV (about 1430 rpm)
  5×CAV (about 2870 rpm)
  8×CAV (about 4590 rpm)

The control unit 116 controls the disk rotating unit 103 to make a rotation at the first rotational speed. It is preferable that the first rotational speed is a sufficiently low speed causing no vibration when the information disk 102 is rotated. For example, in the present embodiment, measurements are performed at the first rotational speed of CD 8×CAV (1660 rpm) and DVD 2.5×CAV (1430 rpm).

Then, the radius direction driving unit 109 is made non-operational. Track crossing is caused by an eccentric component between the tracks of the information disk 102 and the reading unit 104. Thus, for each area provided by dividing one rotation into m (m is a natural number equal to or larger than 2), the counted value of the counting unit 115 is obtained with the code indicating a track cross direction based on the output of the rotational position information output unit 114.

Since rotational position information is normally detected using the FG pulse of a spindle motor, m is determined according to the number of poles of the motor. In the case of three poles, the area is divided into six at a rising edge and a falling edge. In the case of four poles, the area is similarly divided into eight. Of course, the plurality of divided areas may be regarded as one area to obtain a counted value with a smaller number of areas, or one area may be time-divided to obtain a counted value with a larger number of areas.

The present embodiment will describe an example of dividing one rotation into six areas to obtain a counted value by using a spindle motor with three poles.

Counted value data obtained at the first rotational speed where one rotation is divided into six areas m=6, is expressed by the terms DAT1[1] through DAT1[6].

FIG. 2 shows a relationship between a disk rotation angle and a rotational position information signal, a track cross signal, and a track relative position.

Further, measurements are performed at the second, third, . . . speeds higher than the first speed. The present embodiment will describe an example of measurements only at the second rotational speed higher than the first rotational speed.

Also in the step of obtaining a counted value of the counting unit 115 when a rotation is made at the second speed higher than the first speed, the counting results of the number of track crossing times can be obtained at a rotation angle of 60 degrees as in the step of obtaining the counting results of the counting unit 115 when a rotation is made at the first speed. In the present embodiment, a counted value is obtained at a common rotational speed of 4000 rpm in order to decide whether or not reproduction can be performed at the maximum speed (CD 24×CAV, DVD 8×CAV) both on a DVD-ROM and a CD-ROM.

The control unit 116 controls the disk rotating unit 103 to make a rotation at 4000 rpm. Similarly, the radius direction driving unit 109 is made non-operational. Then, track crossing is caused by an eccentric component+a vibration component between the tracks of the information disk 102 and the reading unit 104. Thus, the counted value of the counting unit 115 is obtained with the code indicating a track cross direction based on the output of the rotational position information output unit 114 for each of the areas obtained by dividing one rotation into six. The obtained counted values for the second rotational speed where one rotation is divided into six areas, m=6, is expressed by the terms DAT2[1] through DAT2[6].

FIG. 3 shows a relationship between a disk rotation angle and a rotational position information signal, a track cross signal, and a track relative position.

Therefore, track crossing caused by a vibration is calculated by subtracting a counted value at the first rotational speed from a counted value at the second rotational speed (4000 rpm) at each corresponding rotation angle. FIG. 4 shows the relationship.

The data of each area is expressed by the equation below. The terms DAT1[1] through DAT1[6] are the counted value data obtained at the first rotational speed where one rotational is divided into six areas, m=6. The terms DAT2[1] through DAT2[6] are the counted value data obtained at the second rotational speed where one rotation is divided into six areas, m=6. For instance, DAT2[3] is the counted value data of the second rotational speed in the third angular division. The terms DAT1[1] through DAT1[6] are shown by the curve LOW SPEED ROTATION (ECCENTRICITY COMPONENT) shown in FIG. 4. The terms DAT2[1] through DAT2[6] are shown by the curve HIGH SPEED ROTATION (ECCENTRICITY+VIBRATION COMPONENT) shown in FIG. 4. The term DAT[1] through DAT[6] are the counted value data corresponding to the VIBRATION COMPONENT and are determined from the equation below. Subtracting DAT1[1] from DAT2[1] produces the counted value data corresponding to the VIBRATION COMPONENT of DAT[1].

DAT[1]=DAT2[1]−DAT1[1]

DAT[2]=DAT2[2]−DAT1[2]

DAT[3]=DAT2[3]−DAT1[3]

DAT[4]=DAT2[4]−DAT1[4]

DAT[5]=DAT2[5]−DAT1[5]

DAT[6]=DAT2[6]−DAT1[6]    (Equation 26)

To be precise, based on the data, vibration amplitude is expressed by the equation below.

$$\text{VIBRATIN AMPLITUDE 1}[n] = \frac{2}{\sqrt{3}} \sqrt{|DAT[n]^2 + DAT[n]DAT[n+1] + DAT[n+1]^2|}$$ (Equation 35)

$$\text{VIBRATION AMPLITUDE2}[n] = \frac{2}{\sqrt{3}} \sqrt{|DAT[n]^2 - DAT[n]DAT[n+2] + DAT[n+2]^2|}$$ (Equation 36)

(when n=1 to 6 and n+6, n=n−6 is established).

In order to prevent an increase in the number of calculating steps, approximation is performed in a simplified manner by the equation below.

$$\text{VIBRATION QUANTITY} = \frac{1}{4}\sum_{x=1}^{6} |DAT[x]|$$ (Equation 37)

By comparing a vibration detection value obtained by (equation 37) with a predetermined threshold value, it is decided whether or not reproduction should be performed at the maximum rotational speed. When a vibration quantity equal to or larger than the threshold value is detected, the reproducing speed of a CD is limited up to 16×CAV and the reproducing speed of a DVD is limited up to 5×CAV. When a vibration quantity equal to or larger than the threshold value is not detected, reproduction can be performed both on a CD and a DVD at the maximum reproducing speed.

As described above, according to Embodiment 1, a vibration detection value proportionate to vibration amplitude can be calculated without the necessity for complicated calculations. Thus, it is possible to promptly calculate a vibration detection value and control a recording/reproducing speed without the necessity for an extra number of program steps.

Besides, the present embodiment described the DVD-ROM reproducing device as an example. The present embodiment can be similarly carried out in a disk recording/reproducing device such as a CD-ROM reproducing device and a CD-R/RW recording/reproducing device.

Further, the present embodiment described the example in which the information disk 102 is rotated at CAV (constant rotational speed) during reproduction. Even when the information disk 102 is controlled at CLV (constant linear velocity), ZCLV (constant linear velocity in each zone), PCAV (combination of CLV and CAV), and so on during recording and reproduction, the present embodiment can be similarly carried out by deciding whether control is performed so as to have a speed not reaching the rotational speed for the similar vibration detection or a speed around the rotational speed, or control is performed so as to rotate the information disk 102 to the maximum rotational speed.

Further, the present embodiment described the example in which the rotational speed of the information disk 102 is controlled by measuring track crossing, caused by eccentricity+vibration, only at the second rotational speed higher than the first rotational speed. The present embodiment can be similarly carried out by performing measurements at one or more rotational speeds such as the second, third, . . . rotational speeds higher than the first rotational speed and comparing a vibration quantity with a threshold value having been prepared for each of the rotational speeds.

Moreover, the present embodiment described the example in which the spindle motor serving as the disk rotating unit 103 has three poles, the rising edge and the falling edge of the FG pulse are used to divide one rotation into six areas, and track crossing is measured for each of the areas. The present embodiment can be similarly carried out when the spindle motor has four poles and one rotation is divided into eight areas and when the one rotation is divided into more areas.

Embodiment 2

Referring to FIGS. 5 to 7, the following will describe an information disk recording/reproducing device and a method for controlling a recording/reproducing speed thereof according to Embodiment 2. A DVD-ROM reproducing device will be discussed as an example.

FIG. 5 is a block diagram showing the configuration of the DVD-ROM reproducing device serving as an example of the information disk recording/reproducing device according to Embodiment 2. FIG. 6 is an explanatory drawing showing a method for calculating track crossing caused by a vibration based on the measurement results of track crossing caused by eccentricity at a first rotational speed (low-speed rotation) and the measurement results of track crossing caused by eccentricity+vibration at second, third, . . . , rotational speeds (high-speed rotation) higher than the first rotational speed according to Embodiment 2. FIG. 7 is an explanatory drawing showing a difference of counted values between the presence and absence of the detection of a track cross direction according to Embodiment 2.

In FIG. 5, a DVD-ROM reproducing device 101 can reproduce a variety of optical disks 102. The DVD-ROM reproducing device 101 described in the present embodiment can reproduce, for example, disks of CD-ROM (CD-ROM, CD-R, and CD-RW), DVD-ROM (DVD-5, DVD-9, DVD-R4.7G), and DVD-R3.9G.

Reference numeral 103 denotes a disk rotating unit which rotates the optical disk 102 loaded in the DVD-ROM reproducing device 101 at a predetermined speed. Reference numeral 104 denotes a reading unit which reads an information signal from the optical disk 102. The reading unit 104 is constituted of, for example, a laser light-emitting element 105 having two different oscillation wavelengths for a CD-ROM and a DVD-ROM, an objective lens 106 for gathering laser light, and a light detecting element 107 having two systems for a CD-ROM and a DVD-ROM in the DVD-ROM device. The output of the light detecting element 107 is amplified, an output signal from the light detecting element 107 is selected according to the kind of the optical disk 102, and a tracking error signal (TE), a focus error signal (FE), a reproduction signal (RF), an All Sum signal (AS), an RF envelope signal (RFENV) and so on are generated based on the output signal, and the signals are outputted. Reference numeral 108 denotes a converting unit which converts a reproduction signal outputted from the reading unit 104 to digital data.

Reference numeral 109 denotes a radius direction driving unit which drives the reading unit 104 in the radius direction of the optical disk 102. The radius direction driving unit 109 is constituted of, for example, a traverse driving unit 110 which moves the whole reading unit 104 in the radius direction of the optical disk and a tracking actuator 111 which drives the object lens 106 in the reading unit 104 in the radius direction and finely drives the object lens 106 in the radius direction of the optical disk 102.

Reference numeral 112 denotes a track cross detecting unit which generates a track cross pulse based on a reproduction signal when the laser light of the reading unit 104 traverses tracks on the optical disk.

Reference numeral 113 denotes a track cross direction detecting unit which detects a direction when the laser light of the reading unit 104 traverses the tracks on the optical disk. For example, the track cross detecting unit 112 and the track cross direction detecting unit 113 binarize a tracking error signal, which is outputted from the reading unit 104, by using a hysteresis comparator, a comparator, or the like and generate a track count signal TKC. Further, a non-on-track signal OFTR is similarly generated from the envelope of an RF signal and a track cross direction signal is generated based on a phase relationship between TCK and OFTR signals. A method of directly using the TKC and a method of latching the TKC by OFTR to generate a detected pulse, and other methods are available for a track cross detected pulse.

Reference numeral 114 denotes a rotational position information output unit which detects the rotation angle of the disk rotating unit 103. The rotational position information output unit 114 generally uses a signal called an FG pulse which is generated from, for example, the output of a Hall device of a disk motor. As to the FG signal, three pulses are outputted for one rotation in a three-phase motor. Thus, a rotation angle can be detected in 60 degrees by counting both of a rising edge and a falling edge. Moreover, other than the FG pulse, the following method is available: a rotational speed detecting unit using an encoder is added to a disk motor and a rotational speed is detected with an arbitrary resolution.

Reference numeral 201 denotes a rotational position information dividing unit which further divides rotational position information, which is outputted from the rotational position information output unit 114, evenly into m and outputs more detailed rotational position information. As a dividing method, the following is applicable: a method of dividing the interval of the rotational position information into k and a method of further dividing one-division time of the rotational position information output unit 114 into k based on time for one rotation.

Reference numeral 115 denotes a counting unit which has a mode for counting the number of track crossing times with a code indicating a direction based on the outputs of the track cross detecting unit 112 and the track cross direction detecting unit 113 according to the output of the rotational position information dividing unit 201 and a mode for performing counting without a code indicating a track cross direction. When rotational position information can be outputted every 60 degrees as described above, one rotation is divided into six×k areas and the number of track counts is counted with or without the code for each of the areas.

Reference numeral 116 denotes a control unit which receives signals from the converting unit 108 and the counting unit 115, processes the signals, and controls the disk rotating unit 103, the reading unit 104, the converting unit 108, and the radius direction driving unit 109.

Subsequently, the following will describe the operation of the control unit 116 which detects a vibration and sets the maximum rotational speed.

Referring to FIG. 6, the present embodiment will describe an example in which the DVD-ROM reproducing device 101 has corresponding reproducing speeds of:
CD: 8×CAV (about 1660 rpm)
   16×CAV (about 3330 rpm)
   24×CAV (about 4990 rpm)
DVD: 2.5×CAV (about 1430 rpm)
   5×CAV (about 2870 rpm)
   8×CAV (about 4590 rpm), the output of the rotational position information output unit 114 has one rotation divided into six, and the rotational position information dividing unit 201 has the number of divisions k=2.

The control unit 116 controls the disk rotating unit 103 to make a rotation at the first rotational speed. It is preferable that the first rotational speed is a sufficiently low speed causing no vibration when the information disk 102 is rotated. For example, in the present embodiment, measurements are performed at the first rotational speed of CD 8×CAV (1660 rpm) and DVD 2.5×CAV (1430 rpm).

Then, the radius direction driving unit 109 is made non-operational. Since Track crossing is caused by an eccentric component between the tracks of the information disk 102 and the reading unit 104. Thus, for each area obtained by dividing 5 one rotation into 6×2=12, the counted value of the counting code unit 115 is obtained with the code indicating a track cross direction based on the output of the rotational position information driving unit 2J1.

Counted value data obtained at the first rotational speed where one rotation is divided into six areas, m=6, is expressed by the terms DAT1[1] through DAT1[6].

Further, measurements are performed at the second, third, . . . speeds higher than the first speed. The present embodiment will describe an example of measurements only at the second rotational speed higher than the first rotational speed.

Also in the step of obtaining a counted value of the counting unit 115 when a rotation is made at the second speed higher than the first speed, the counting results of the number of track crossing times can be obtained at a rotation angle of 30 degrees, which is obtained by dividing one rotation into twelve, as in the step of obtaining the measurement results of the counting unit 115 when a rotation is made at the first speed. In the present embodiment, a counted value is obtained at a common rotational speed of 4000 rpm in order to decide whether or not reproduction can be performed at the maximum speed (CD 24×CAV, DVD 8×CAV) both on a DVD-ROM and a CD-ROM.

The control unit 116 controls the disk rotating unit 103 to make a rotation at 4000 rpm. Similarly, the radius direction driving unit 109 is made non-operational. Then, track crossing is caused by an eccentric component+a vibration component between the tracks of the information disk 102 and the reading unit 104. Thus, the counted value of the counting unit 115 is obtained with the code indicating a track cross direction based on the output of the rotational position information output unit 114 for each of the areas obtained by dividing one rotation into six. The obtained counted values for the second rotational speed where one rotation is divided into twelve areas, m=12, is expressed by the terms DAT2[1] through DAT2[12].

Therefore, track crossing caused by a vibration is obtained by subtracting a counted value at the first rotational speed from a counted value at the second rotational speed (4000 rpm) at each corresponding rotational angle. FIG. 6 shows the relationship.

The data of each area is expressed by the equation below. The terms DAT1[1] through DAT1[12] are the counted value data obtained at the first rotational speed where one rotational is divided into six areas, m=12. The terms DAT2[1] through DAT2[6] are the counted value data obtained at the second rotational speed where one rotation is divided into twelve areas, m=12. For instance, DAT2[12] is the counted value data of the second rotational speed in the twelfth angular division. The terms DAT1[1] through DAT1[12] are shown by the curve LOW SPEED ROTATION (ECCENTRICITY COMPONENT) shown in FIG. 6. The terms DAT2[1] through DAT2[12] are shown by the curve HIGH SPEED ROTATION (ECCENTRICITY+VIBRATION COMPONENT) shown in FIG. 6. The terms DAT[1] through DAT[12] are the counted value data corresponding to the VIBRATION COMPONENT and are determined from the equation below. Subtracting DAT1[1] from DAT2[1] produces the counted value data corresponding to the VIBRATION COMPONENT of DAT[1].

DAT[1]=DAT2[1]−DAT1[1]

DAT[2]=DAT2[2]−DAT1[2]

DAT[3]=DAT2[3]−DAT1[3]

DAT[4]=DAT2[4]−DAT1[4]

DAT[5]=DAT2[5]−DAT1[5]

DAT[6]=DAT2[6]−DAT1[6]

DAT[7]=DAT2[7]−DAT1[7]

DAT[8]=DAT2[8]−DAT1[8]

DAT[9]=DAT2[9]−DAT1[9]

DAT[10]=DAT2[10]−DAT1[10]

DAT[11]=DAT2[11]−DAT1[11]

DAT[12]=DAT2[12]−DAT1[12]     (Equation 30)

Based on the data, vibration amplitude is approximated by the equation below.

$$\text{VIBRATION QUANTITY} = \frac{1}{4}\sum_{x=1}^{12} |DAT[x]| \qquad \text{(Equation 41)}$$

By comparing a vibration detection value obtained by (equation 31) with a predetermined threshold value, it is decided whether or not reproduction should be performed at the maximum rotational speed. Additionally, a vibration quantity obtained by (equation 31) includes an error relative to a precise vibration quantity. The error will be described below.

If the counted values of DAT[1] to DAT[12] are counted without the code indicating a track cross direction, no error occurs relative to the precise vibration quantity. The sum of DAT[1] to DAT[12] serves as a total number of traversed tracks for one rotation and one fourth of the sum serves as a vibration quantity. However, in order to measure an eccentric component in advance, measure eccentricity+a vibration component, calculate a difference between the measurement results, and acquire track cross data of the vibration component, it is necessary to provide data having counted values which are counted with the code indicating a track cross direction. As a matter of course, the counted value of the vibration component that serves as the difference also has the code.

Between the sum of absolute values of data having the code and the sum of absolute values of data not having the code, an error occurs on a part where the track cross direction is reversed. For example, as shown in FIG. 7(*a*), when areas obtained by dividing one rotation have a boundary coincident with the part where the track cross direction is reversed, regarding the counting results of the number of traversed tracks in DAT[a] and DAT[a+1] areas, absolute values are equal in counting with the code indicating the track cross direction and counting not having the code.

However, as shown in FIG. 7(*b*), when areas obtained by dividing one rotation has a boundary in the DAT[a] area, in the case of counting without the code indicating the track cross direction, the sum of traversed tracks before and after the reversal of the track cross direction is counted. Meanwhile, when counting is performed with the code, the code of the counting result of the traversed tracks is also reversed on the part where the track cross direction is reversed. Thus, the counting result of the area is a difference between counted values before and after the reversal of the track cross direction. As a matter of course, the difference between the counting results decreases as the number of divisions for one rotation increases and an area decreases where the track cross direction is reversed.

As described above, according to Embodiment 2, the number of traversed tracks is counted for each of the k areas obtained by evenly dividing the rotational position information of the rotational position information detecting unit. Thus, it is possible to acquire more detailed rotational position information for one rotation, increase accuracy, and calculate a vibration detection value proportionate to vibration amplitude without the necessity for complicated calculations. Hence, it is possible to promptly calculate a vibration detection value and control a recording/reproducing speed without an extra number of program steps.

Besides, the present embodiment described the DVD-ROM reproducing device as an example. The present embodiment can be similarly carried out in a disk recording/ reproducing device such as a CD-ROM reproducing device and a CD-R/RW recording/reproducing device.

Further, the present embodiment described the example in which the information disk 102 is rotated at CAV (constant rotational speed) during reproduction. Even when the information disk 102 is controlled at CLV (constant linear velocity), ZCLV (constant linear velocity in each zone), PCAV (combination of CLV and CAV), and so on during recording and reproduction, the present embodiment can be similarly carried out by deciding whether control is performed so as to have a speed not reaching the rotational speed for the similar vibration detection or a speed around the rotational speed, or control is performed so as to rotate the information disk 102 to the maximum rotational speed.

Further, the present embodiment described the example in which the rotational speed of the information disk 102 is controlled by measuring track crossing, caused by eccentricity+vibration, only at the second rotational speed higher than the first rotational speed. The present embodiment can be similarly carried out by performing measurements at one or more rotational speeds such as the second, third, . . . speeds higher than the first rotational speed and comparing a vibration quantity with a threshold value having been prepared for each of the rotational speeds.

Moreover, the present embodiment described the example in which the spindle motor serving as the disk rotating unit 103 have three poles, one rotation is divided into six areas and each area is further divided into two by using the rising edge and the falling edge of the FG pulse, and track crossing is measured for each of the areas obtained by dividing one rotation into 12. The present embodiment can be similarly carried out when the spindle motor has four poles and one rotation is divided into eight areas and when one rotation is divided into more areas.

Embodiment 3

Referring to FIG. 8, the following will describe an information disk recording/reproducing device and a method for controlling a recording/reproducing speed thereof according to Embodiment 3 of the present invention. A DVD-ROM reproducing device will be discussed as an example.

FIG. 8 is an explanatory drawing showing an error calculating method when a track cross direction is detected and a vibration quantity has the maximum error and the minimum error during the measurement of track crossing in the information disk recording/reproducing device according to Embodiment 3. A block diagram showing the configuration of the information disk recording/reproducing device according to Embodiment 3 is identical to that of Embodiment 2. The explanation of the constituent elements performing the same operations is omitted.

Measurements are performed as the case where a total number of divisions is m for one rotation. The track cross data of a vibration component for each divided area where one rotation is divided into m areas is expressed by the terms DAT[1] through DAT[m].

Based on the data, vibration amplitude is approximated by the equation below.

$$\text{VIBRATION QUANTITY} = \frac{1}{4}\sum_{x=1}^{m} |DAT[x]| \quad \text{(Equation 43)}$$

By comparing a vibration detection value obtained by (equation 32) with a predetermined threshold value, it is decided whether or not reproduction should be performed at the maximum rotational speed.

Additionally, a vibration quantity obtained by (equation 32) includes an error relative to a precise vibration quantity. The error will be described below.

As described in Embodiment 2, as the number of divisions increases for one rotation, a vibration quantity expressed by (equation 32) has a smaller calculated error. However, the number of divisions for one rotation of a rotational position information output unit 114 is limited by hardware. The number of divisions is six or eight when an FG pulse is used.

Further, a sufficient number of divisions is acquired in effect by using a rotational position information dividing unit 201 or attaching an encoder to a disk rotating unit 103. When the encoder is used, the cost increases. When the number of divisions is increased more than necessary, a work memory for storing counted values is increased in capacity, considerably consuming a valuable hardware resource such as a signal processing IC. Thus, the use of the encoder is not preferable. For this reason, the number of divisions for one rotation needs to be determined so as to be minimum within a required error range.

If the counted values of DAT[1] to DAT[m] are counted without the code indicating a track cross direction, no error occurs relative to a precise vibration quantity. The sum of DAT[1] to DAT[12] serves as a total number of traversed tracks for one rotation and one fourth of the sum serves as a vibration quantity. However, in order to measure an eccentric component in advance, measure eccentricity+a vibration component, calculate a difference between the measurement results, and acquire track cross data of the vibration component, it is necessary to provide data having counted values which are counted with the code indicating a track cross direction. As a matter of course, the counted value of the vibration component that serves as the difference also has the code.

Between the sum of absolute values of data having the code and the sum of absolute values of data not having the code, an error occurs on a part where the track cross direction is reversed. For example, as shown in FIG. 8(a), when areas obtained by dividing one rotation has a boundary coinciding with the part where the track cross direction is reversed, regarding the counting results of the number of traversed tracks in DAT[a] and DAT[a+1] areas, absolute values are equal in counting with the code indicating the track cross direction and in counting not having the code. When m is an even number, an error is 0 in an area including a part where a track cross direction is reversed, at two points on a diagonal line.

However, as shown in FIG. 8(b), an error occurs when areas obtained by dividing one rotation has a boundary in DAT[a] area. When counting is performed without a code indicating a track cross direction, the sum of the number of traversed tracks before and after the track cross direction is reversed. Meanwhile, when counting is performed with the code, the code of the counting result of the traversed tracks is also reversed on the part where the track cross direction is reversed. Thus, the counting result of the area is a difference between counted values before and after the track cross direction is reversed.

The maximum error occurs when the m division for one rotation is an even number and the counting result is 0 in an area of the part where the track cross direction is reversed. At this point, since the number of divisions for one rotation is m, as shown in FIG. 8(b), regarding the number of traversed tracks before and after the track cross direction is reversed in the area, absolute values are expressed by the equation below.

$$A\left(1 - \cos\frac{\pi}{m}\right)$$ (Equation 44)

Therefore, regarding an error of the number of traversed tracks for one rotation, a maximum value d is expressed by the equation below.

$$d = 4A\left(1 - \cos\frac{\pi}{m}\right)$$ (Equation 45)

A total number of traversed tracks for one rotation is expressed by the equation below.

$$\text{TORTAL NUMBER OF TRAVERSED TRACKS} = \int_0^{2\pi} A|\cos(\omega t)|$$ (Equation 46)
$$= 4A$$

Hence, a percentage of an error to the total number of traversed tracks is expressed by the equation below.

$$\frac{d}{\text{TOTAL NUMBER OF TRAVERSED TRACKS}} = 1 - \cos\frac{\pi}{m}$$ (Equation 47)

Additionally, when m is an odd number, even in the case where the counting result of the number of traversed-tracks is 0 in one area while a direction is detected, the counting result of traversed tracks is not 0 in the area on the diagonal line. Thus, an error is always smaller than the value of (equation 47).

Based on the number of divisions for one rotation, an error of the total number of traversed tracks or vibration amplitude for one rotation can be expressed by (equation 47). Thus, in consideration of accuracy required to measure vibration amplitude, an error can be evaluated using (equation 47) to determine the number of divisions for one rotation. For example, when the rotational position information output unit 114 is configured using FG, the number of divisions for one rotation is generally six or eight (two times the number of poles of the magnetic pole in the spindle motor) in this part.

When an error on the calculation of a vibration quantity is desired to be set at 1% or less, the number of divisions in the rotational position information dividing unit is set at four or three and the number of divisions for one rotation is set at 24. Hence, the vibration quantity has an error of about 0.9% according to (equation 47). Even when a required error is desired to be set at other value than this value, the present embodiment can be enabled similarly to this case by setting the m divisions for one rotation so that an error value is calculated by (equation 47) based on the m divisions for one rotation to have an error smaller than the required error.

As described above, according to Embodiment 3, it is possible to keep an error of a calculated vibration quantity value with required accuracy while minimizing the number of divisions of the rotational position information output unit. Thus, without the necessity for an extra number of program steps, it is possible to promptly calculate a vibration detection value and control a recording/reproducing speed.

Besides, the present embodiment described the example of the DVD-ROM reproducing device. The present embodiment can be similarly carried out in a disk recording/reproducing device such as a CD-ROM reproducing device and a CD-R/RW recording/reproducing device.

The invention claimed is:

1. An information disk recording/reproducing device, in which recording or reproduction can be performed on an information disk having an information recording track formed like a spiral or a concentric circle, comprising:
    a disk rotating unit for rotating an information disk;
    a rotational position information output unit for outputting rotational position information based on information indicating a rotation angle of the disk rotating unit by dividing one rotation into m angular divisions;
    a reading unit for reading an information signal from an information disk;
    a radius direction driving unit for driving the reading unit in a radius direction of an information disk;
    a track cross detecting unit for detecting crossing of and generating a track cross signal based on a reproduction signal when the reading unit traverses an information recording track by the driving of the radius direction driving unit;
    a track cross direction detecting unit for detecting a direction of a track crossing caused by a crossing based on the reproduction signal when the reading unit traverses an information recording track by the driving of the radius direction driving unit;
    a counting unit for counting pulses of a track cross signal from the track cross detecting unit, with a code indicating a track cross direction from the track cross direction detecting unit, based on an output from the rotational position information output; and
    a control unit which rotates the disk rotating unit at a first speed, obtains a first counted value of the counting unit while not operating the radius direction driving unit, rotates the disk rotating unit at one or more rotational speeds higher than a first rotational speed, obtains a second counted value from the counting unit while not operating the radius direction driving unit, and compares a predetermined threshold value to a vibration detection value as a function of a sum of absolute values of a difference between the first counted value and the second counted value.

2. An information disk recording/reproducing device, in which recording or reproduction can be performed on an information disk having an information recording track formed like a spiral or a concentric circle, comprising:
    a disk rotating unit for rotating an information disk;
    a rotational position information output unit for outputting rotational position information based on information indicating a rotation angle of the disk rotating unit by dividing one rotation into n angular divisions;
    a rotational position information dividing unit which further divides each of the n angular divisions into k subdivisions and outputs the rotational position information;
    a reading unit for reading an information signal from an information disk;
    a radius direction driving unit for driving the reading unit in the radius direction of an information disk;

a track cross detecting unit for detecting crossing of a track and generating a track cross signal based on a reproduction signal when the reading unit traverses an information recording track by the driving of the radius direction driving unit;

a track cross direction detecting unit for detecting a direction of a track cross caused by a crossing based on the reproduction signal when the reading unit traverses an information recording track by the driving of the radius direction driving unit;

a counting unit for counting pulses of a track cross signal from the track cross detecting unit, with a code indicating a track cross direction from the track cross direction detecting unit, based on an output from the rotational position information dividing unit; and a control unit which rotates the disk rotating unit at a first speed, obtains a first counted value of the counting unit while not operating the radius direction driving unit, rotates the disk rotating unit at one or more rotational speeds higher than a first rotational speed, obtains a second counted value from the counting unit while not operating the radius direction driving unit, and compares a predetermined threshold value to a vibration detection value as a function of a sum of absolute values of a difference between the first counted value and the second counted value.

3. The information disk recording/reproducing device according to claim 1, wherein in each of the m angular divisions, a vibration component is given by a difference between the first counted value and the second counted value in a particular angular division, the vibration component for each angular division is expressed by the terms DAT[1] through DAT[m], wherein a vibration quantity is given by:

$$\text{VIBRATION QUANTITY} = \frac{1}{4}\sum_{x=1}^{m} |DAT[x]|,$$

and a value proportionate to the vibration quantity is used as a vibration detection value.

4. The information disk recording/reproducing device according to claim 1, wherein in each of the m angular divisions, a vibration component is given by a difference between the first counted value and the second counted value in a particular angular division, the vibration component for each angular division is expressed by the terms DAT[1] through DAT[m], wherein a vibration quantity is given by:

$$\text{VIBRATION QUANTITY} = \frac{1}{4}\sum_{x=1}^{m} |DAT[x]| \quad \text{(Equation 4)}$$

a value proportionate to the vibration quantity is used as a vibration detection value, and the m angular divisions for one rotation, is determined within a permissible error range based on a maximum value of an error relative to an actual vibration quantity, the maximum value being expressed by:

$$\text{ERROR} \leq 1 - \cos\frac{\pi}{m}.$$

5. The information disk recording/reproducing device according to claim 1, wherein in each of the m angular divisions, a vibration component is given by a difference between the first counted value and the second counted value in a particular angular division, the vibration component for each angular division is expressed by the terms DAT[1] through DATm[m], wherein a vibration quantity is given by:

$$\text{VIBRATION QUANTITY} = \frac{1}{4}\sum_{x=1}^{m} |DAT[x]| \quad \text{(Equation 7)}$$

a value proportionate to the vibration quantity is used as a vibration detection value, and the m angular divisions for one rotation is set at 24 that an error relative to an actual vibration quantity at this point has a maximum value of 1% or less.

6. A method for controlling a recording/reproducing speed of an information disk recording/reproducing device, in which recording or reproduction can be performed on an information disk having an information recording track formed like a spiral or a concentric circle, the device comprising a disk rotating unit for rotating the information disk, a reading unit for reading an information signal from the information disk, and a radius direction driving unit for driving the reading unit in a radius direction of the information disk, the method comprising the steps of:

rotating an information disk;

outputting rotational position information by dividing one rotation into m angular divisions;

reading an information signal from an information disk;

driving the reading unit in the radius direction of an information disk;

detecting a crossing of a track and generating a track cross signal based on a reproduction signal when the reading unit traverses an information recording track by the driving of the radius direction driving unit;

detecting a direction of a track cross caused by a crossing based on the reproduction signal when the reading unit traverses an information recording track by the driving of the radius direction driving unit;

counting pulses of a track cross signal, with a code indicating the track cross direction, to obtain a first counted value by dividing one rotation of the rotational position information into m angular divisions while rotating the disk rotating unit at a first speed and not operating the radius direction driving unit;

counting pulses of the track cross signal, with the code indicating the track cross direction, to obtain a second counted value by dividing one rotation of the rotational position information into m angular divisions while rotating the disk rotating unit at one or more speeds higher than a first speed and not operating the radius direction driving unit; and comparing a predetermined threshold value to a vibration detection value as a function of a sum of absolute values of a difference between the first counted value and the second counted value.

7. A method for controlling a recording/reproducing speed of an information disk recording/reproducing device, in which recording or reproduction can be performed on an information disk having an information recording track formed like a spiral or a concentric circle, the device comprising a disk rotating unit for rotating the information disk, a reading unit for reading an information signal from the information disk, and a radius direction driving unit for driving the reading unit in a radius direction of the information disk, the method comprising the steps of:

rotating an information disk;

outputting rotational position information by dividing one rotation into m angular divisions and subdividing each m angular division into k subdivisions;

reading an information signal from an information disk;

driving the reading unit in the radius direction of an information disk;

detecting a crossing of a track and generating a track cross signal based on a reproduction signal when the reading unit traverses an information recording track by the driving of the radius direction driving unit;

detecting a direction of the track cross caused by the crossing based on the reproduction signal when the reading unit traverses an information recording track by the driving of the radius direction driving unit;

counting pulses of the track cross signal, with a code indicating a track cross direction, to obtain a first counted value by dividing one rotation of the rotational position information into m angular divisions while rotating the disk rotating unit at a first speed and not operating the radius direction driving unit;

counting pulses of the track cross signal, with the code indicating a track cross direction, to obtain a second counted value in each of the areas provided by dividing one rotation of the rotational position information into m angular divisions while rotating the disk rotating unit at one or more rotational speeds higher than a first rotational speed and not operating the radius direction driving unit; and comparing a predetermined threshold value to a vibration detection value as a function of a sum of absolute values of a difference between the first counted value and the second counted value.

8. The method for controlling a recording/reproducing speed of an information disk recording/reproducing device according claim 6, wherein in each of the m angular divisions, a vibration component is given by a difference between the first counted value and the second counted value in a particular angular division, the vibration component for each angular division is expressed by the terms DAT[1] through DAT[m], wherein a vibration quantity is given by:

$$\text{VIBRATION QUANTITY} = \frac{1}{4}\sum_{x=1}^{m} |DAT[x]|,$$

and a value proportionate to the vibration quantity is used as a vibration detection value.

9. The method for controlling a recording/reproducing speed of the information disk recording/reproducing device according claim 6, wherein in each of the m angular divisions, a vibration component is given by a difference between the first counted value and the second counted value in a particular angular division, the vibration component for each angular division is expressed by the terms DAT[1] through DAT[m], wherein a vibration quantity is given by:

$$\text{VIBRATION QUANTITY} = \frac{1}{4}\sum_{x=1}^{m} |DAT[x]| \quad \text{(Equation 11)}$$

a value proportionate to the vibration quantity is used as a vibration detection value, and the m angular divisions for one rotation is determined within a permissible error range based on a maximum value of an error relative to an actual vibration quantity at this point, the maximum value being expressed by:

$$\text{ERROR} \leq 1 - \cos\frac{\pi}{m}.$$

10. The method for controlling a recording/reproducing speed of the information disk recording/reproducing device according to claim 6, wherein in each of the m angular divisions, a vibration component is given by a difference between the first counted value and the second counted value in a particular angular division, the vibration component for each angular division is expressed by the terms DAT[1] through DAT[m], wherein a vibration quantity is given by:

$$\text{VIBRATION QUANTITY} = \frac{1}{4}\sum_{x=1}^{m} |DAT[x]| \quad \text{(Equation 14)}$$

a value proportionate to the vibration quantity is used as a vibration detection value, and the m angular divisions for one rotation is set at 24 so that an error relative to an actual vibration quantity at this point has a maximum value of 1% or less.

\* \* \* \* \*